US008566373B2

(12) United States Patent
Hao et al.

(10) Patent No.: US 8,566,373 B2
(45) Date of Patent: Oct. 22, 2013

(54) PROBABILISTIC FINGERPRINT CHECKING FOR PREVENTING DATA LEAKAGE

(75) Inventors: Fang Hao, Morganville, NJ (US); Krishna P. Puttaswamy Naga, Metuchen, NJ (US); Murali Kodialam, Marlboro, NJ (US); Tirunell V. Lakshman, Morganville, NJ (US)

(73) Assignee: Alcatel Lucent, Paris (FR)

( * ) Notice: Subject to any disclaimer, the term of this patent is extended or adjusted under 35 U.S.C. 154(b) by 0 days.

(21) Appl. No.: 13/367,441

(22) Filed: Feb. 7, 2012

(65) Prior Publication Data

US 2013/0204903 A1    Aug. 8, 2013

(51) Int. Cl.
*G06F 17/30* (2006.01)
(52) U.S. Cl.
USPC .......................................... 707/825; 707/802
(58) Field of Classification Search
USPC ................................................ 707/802, 825
See application file for complete search history.

(56) References Cited

U.S. PATENT DOCUMENTS 7,660,902 B2 *    2/2010   Graham et al. ............... 709/229

OTHER PUBLICATIONS

Mahesh Sooriyabandara, Parag Kulkarni, Lu Li, Tim Lewis, Tim Farnham, and Russell J Haines, "Experiences with Discriminating TCP Loss using K-Means Clustering", IEEE, 2010, pp. 352-357.*

B. H. Bloom, "Space/Time Trade-Offs in Hash: Coding with Allowable Errors," Communications of the ACM, vol. 13, No. 7, Jul. 1979, pp. 422-426.
K. Borders and A. Prakash, "Quantifying Information Leaks in Outbound Web Traffic," 30th IEEE Symposium on Security and Privacy, IEEE Computer Society, Washington, DC, 209, pp. 129-140.
"Cisco Data Loss Prevention," http://www.cisco.com/en/US/prod/yondeycios10126/os10154/dlp_overview.html, printed May 14, 2013, pp. 1-2.
"Data Loss Statistics, " DATALOSSdb Open Security Foundation, http://www.datalossdb.org/statistics, printed May 22, 2013, pp. 1-6.
P. Ducklin, "Dropbox lets anyone log in as anyone—so check your files now!", http://nakedsecurity.sophos.com/2011/06/21/dropbox-lets -anyone-log-in-as-anyone/, printed May 14, 2013, pp. 1-9.
L. Fan, et al., "Summary Cache: A Scalable Wide-Area Web Cache Shading Protocol," IEEE/ACM Transactions on Networking, vol. 8, No. 3, Jun. 2000, pp. 281-293.
F. Hao, et al., "Building High Accuracy Bloom Filters Using Partioned Hashing, " SIGMETRICS'07, Jun. 12-18, 2007, San Diego, CA., pp. 277-287.

(Continued)

*Primary Examiner* — Cheryl Lewis
(74) *Attorney, Agent, or Firm* — Wall & Tong, LLP

(57) ABSTRACT

A data-leakage prevention capability is presented herein. The data-leakage prevention capability prevents leakage of data, of a file set having a plurality of files, from a secure network using online fingerprint checking of data flows at a boundary of the secure network. The online fingerprint checking is performed using a set of data structures configured for the file set. The data structures for the file set are configured based on file set characteristics information of the file set and a target detection lag indicative of a maximum number of bits within which a data leakage event for the file set is to be determined. The data structure configuration is computed for a plurality of data structures configured for use in monitoring the files of the file set. The data structure configuration includes a plurality of data structure locations and data structure sizes for the respective plurality of data structures.

20 Claims, 10 Drawing Sheets

(56) References Cited

OTHER PUBLICATIONS

J. Kirk, "Amazon Cloud Users Are Leaving Security Holes, Researchers Warn," Security-InfoWorld, http://www.infoworld.com/d/security/amazon-clouse-users-are-leaving-security-holes-researchers-warn-794, printed May 14, 2013, pp. 1-4.

M. Mitzenmacher, "Compressed Bloom Filters," IEEE/ACM Transactions on Networking (TON), vol. 10, No. 5, Oct. 2002, pp. 604-612.

"MyDLP Data Leak Prevention Solution Data Loss Prevention (DLP) Software," http://www.hydip.com/.printed May 22, 2013, pp.1-4.

A. Meyers, et al., "Jif. Java + information flow," http://www.cs.cornell.edu/jif/, printed May 14, 2013, pp. 1-6.

K. Thomas, "Microsoft Cloud Data Breach Heralds Things to Come," http://www.poworld.com/article/214776/microsoft_cloud_data_breath_heralds_things_to_core, printed May 22, 2013, pp. 1-3.

H. Yin, et al., "Panorama: Capturing System-Wide Information Flow For Metware Detection And Analysis," CCS'07, Oct. 29-Nov. 2, 2007, Alexandria, Virginia, pp. 116-127.

S. Yoshihama, et al., "Web-Based Data Leakage Prevention," Proceedings of the International Workshop on Security (IWSEC), 2010, pp. 78-93.

A. Yumerefendi, "TightLip: Keeping Applications From Spilling The Beans," Proceedings of NSDI, 2007, pp. 12-25.

\* cited by examiner

Algorithm 1 Optiomal_Filter_Placement() // Run for a given file size distribution.

1: function Find_BF_Locations_And_Sizes()
2: $f(t) = 0$ for all $1 \leq t \leq l_{max}$;
3: $f(l_{max} - \delta) = 0$;
4: $p(l_{max} - \delta) = \emptyset$;
5: for $t = l_{max} - \delta - 1 \to 0$ do
6: $\quad f(t) = \min_{1 \leq g < \delta} b(t+g, \frac{g}{\delta}) + f(t+g)$
7: $\quad g^* = \arg\min_{1 \leq g < \delta} b(t+g, \frac{g}{\delta}) + f(t+g)$
8: $\quad p(t) = t + g^*$
9: $\quad t \leftarrow t-1$
10: end for
11: $j = 1; t_j \leftarrow p(1)$ {// Print out BF details}
12: while $p(t_j) \neq \emptyset$ do
13: $\quad next \leftarrow p(t_j); j = j+1; t_j \leftarrow next;$
14: $\quad \text{print } t_j, b(t_j, \frac{t_j - t_{j-1}}{\delta})$ {//print position, size}
15: end while

FIG. 7

PROBABILISTIC FINGERPRINT CHECKING FOR PREVENTING DATA LEAKAGE

TECHNICAL FIELD

This case relates generally to fingerprint checking techniques and, more specifically but not exclusively, to using fingerprint checking techniques for preventing data leakage.

BACKGROUND

Data leakage is a fundamental security problem faced by enterprises, cloud service providers, and other entities maintaining secure networks.

SUMMARY

Various deficiencies in the prior art are addressed by embodiments for using fingerprint checking for data leakage prevention.

In one embodiment, an apparatus includes a processor and a memory communicatively coupled to the processor, where the processor is configured to receive file set characteristics information of a file set having a plurality of files, receive a target detection lag indicative of a maximum number of bits within which a data leakage event for the file set is to be determined, and compute, based on the file set characteristics information and the target detection lag, a data structure configuration for a plurality of data structures configured for use in monitoring the files of the file set. The data structure configuration includes a plurality of data structure locations for the respective plurality of data structures and a plurality of data structure sizes for the respective plurality of data structures.

In one embodiment, a computer-readable storage medium stores instructions which, when executed by a computer, cause the computer to perform a method including steps of receiving file set characteristics information of a file set having a plurality of files, receiving a target detection lag indicative of a maximum number of bits within which a data leakage event for the file set is to be determined, and computing, based on the file set characteristics information and the target detection lag, a data structure configuration for a plurality of data structures configured for use in monitoring the files of the file set. The data structure configuration includes a plurality of data structure locations for the respective plurality of data structures and a plurality of data structure sizes for the respective plurality of data structures.

In one embodiment, a method includes using a processor to perform steps of receiving file set characteristics information of a file set having a plurality of files, receiving a target detection lag indicative of a maximum number of bits within which a data leakage event for the file set is to be determined, and computing, based on the file set characteristics information and the target detection lag, a data structure configuration for a plurality of data structures configured for use in monitoring the files of the file set. The data structure configuration includes a plurality of data structure locations for the respective plurality of data structures and a plurality of data structure sizes for the respective plurality of data structures.

BRIEF DESCRIPTION OF THE DRAWINGS

The teachings herein can be readily understood by considering the following detailed description in conjunction with the accompanying drawings, in which:

FIG. 7 depicts exemplary pseudocode for one embodiment of a method for determining a Bloom filter configuration for a file set using a dynamic programming process;

To facilitate understanding, identical reference numerals have been used, where possible, to designate identical elements that are common to the figures.

DETAILED DESCRIPTION

A probabilistic fingerprint checking capability is presented herein, although various other capabilities also may be presented herein.

Although primarily depicted and described herein with respect to embodiments in which the probabilistic fingerprint checking capability is used to prevent leakage of data from a secure network, it is noted that the probabilistic fingerprint checking capability also may be used to prevent leakage of data in various other types of networks and environments.

Although primarily depicted and described herein with respect to embodiments in which the probabilistic fingerprint checking capability is used to prevent data leakage, it is noted that the probabilistic fingerprint checking capability also may be used to provide various other functions in which fingerprint checking may be used.

Although primarily depicted and described herein with respect to embodiments in which a specific type of data structure is used to perform fingerprint checking (namely, Bloom filters), it is noted that various other types of data structures may be used to perform fingerprint checking (e.g., counting bloom filters, hash compaction data structures, data structures for cuckoo hashing, and the like).

Figure 1:
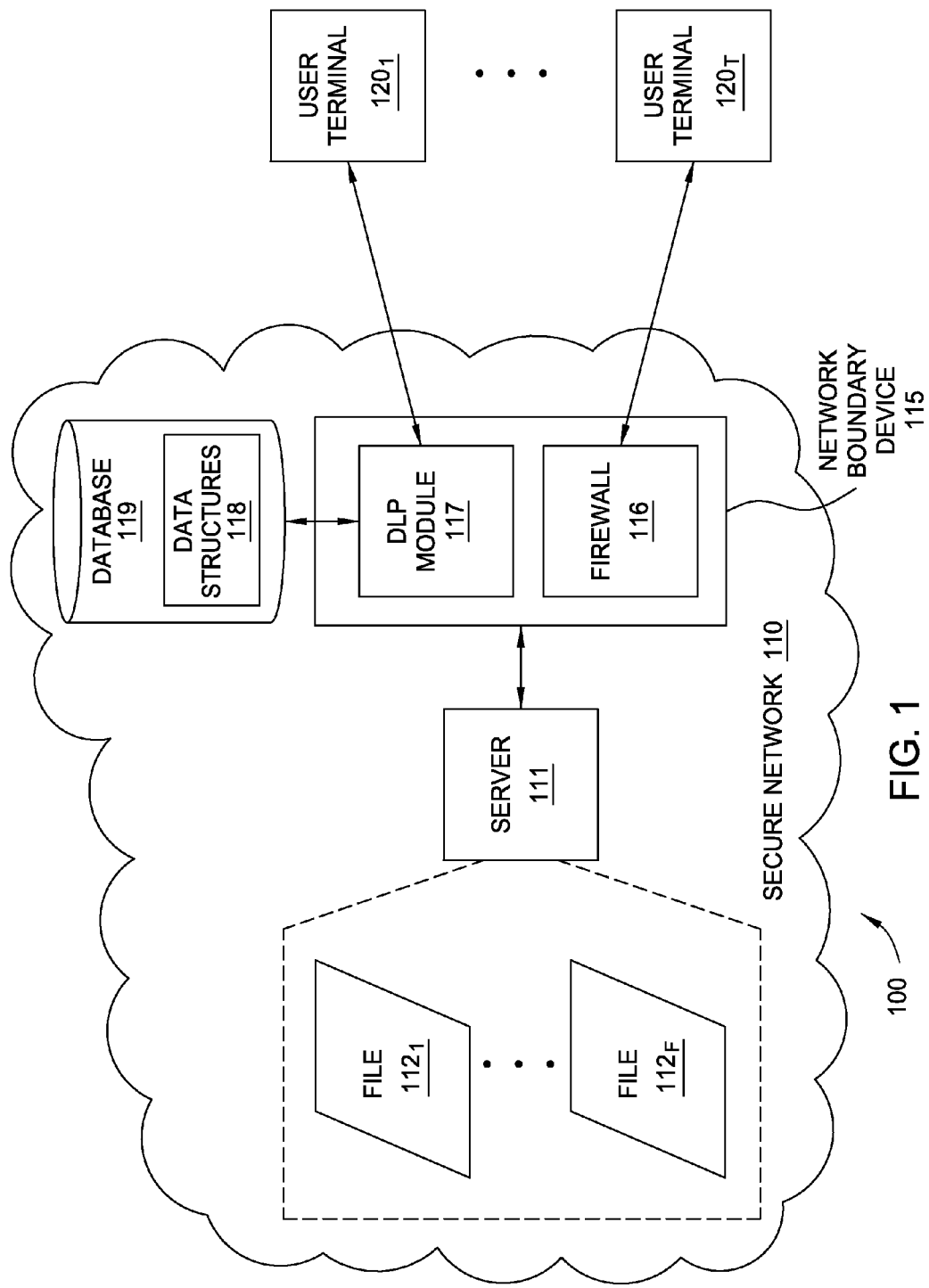
FIG. 1 depicts an exemplary system within which fingerprint checking is used to prevent leakage of data from a secure network.

FIG. 1 depicts an exemplary system within which fingerprint checking is used to prevent leakage of data from a secure network.

As depicted in FIG. 1, system 100 includes a secure network 110 and a plurality of user terminals $120_1$-$120_T$ (collectively, 120).

The secure network 110 may include any type of network which may use security mechanisms for controlling flow of data, such as an enterprise network, a cloud-service provider network, and the like.

The secure network 110 includes a server 111. The server 111 is configured to maintain a file set including a plurality of files $112_1$-$112_F$ (collectively, files 112). The server 111 is configured to respond to requests for files 112. The files 112 may be accessed by users using user terminals 120. The files 112 each may be marked as being unsecure or secure, where files 112 marked as unsecure are allowed to leave the secure network 110 (e.g., via data flows from server 111 to locations outside of secure network 110, such as user terminals 120) and files 112 marked as secure are not allowed to leave the secure network 110. Although primarily depicted and described with respect to use of a single server 111 in secure network 110, it will be appreciated that secure network 110 may include any suitable number of servers. Although primarily depicted and described with respect to maintaining a single file set within secure network 110, it will be appreciated that secure network 110 may maintain any suitable number of file sets using any suitable number of servers.

The secure network 110 includes a network boundary device 115 that is configured to provide security for secure network 110. The network boundary device 115 includes a firewall 116 and a data-leakage prevention (DLP) module 117. Although depicted as forming part of a single device, it is noted that firewall 116 and DLP module 117 may be implemented in any other suitable manner (e.g., as separate devices, where DLP module 117 is a module on firewall 116, and the like). Although primarily depicted and described herein with respect to embodiments in which the network boundary device 115 is separate from server 111, it is noted that various functions of network boundary device 115 may be implemented as part of server 111 (or portions of the functions of network boundary device, e.g., DLP module 117, may be implemented as part of server 111). Other arrangements of these functions/devices are contemplated.

The firewall 116 is configured to perform functions typically performed by a firewall of a secure network such as secure network 110.

The DLP module 117 is configured to perform online checking, for a data flow being propagated from within the secure network 110 to one or more locations outside of the secure network 110, to ensure that the data flow does not include all or part of a file 112 designated as being a secure file.

The DLP module 117 is configured to perform online checking for a data flow being propagated from within the secure network 110 to one or more locations outside of the secure network 110.

The DLP module 117 may perform online checking for a data flow being propagated from within the secure network 110 to one or more locations outside of the secure network 110 for determining whether or not the data flow is allowed to continue to be propagated outside of the secure network 110. In one embodiment, for example, when a data flow being propagated from within secure network 110 to one or more locations outside of secure network 110 is determined to include only data of an unsecured file or files, DLP module 117 allows the data flow to continue. In one embodiment, for example, when a data flow being propagated from within secure network 110 to one or more locations outside of secure network 110 is determined to include data of a secure file or files, DLP module 117 prevents the data flow from continuing (e.g., by dropping the data flow, by redirecting the data flow to another device within secure network 110 for containment and analysis, and the like).

The DLP module 117 may perform online checking using data structures 118 constructed for the files 112 of the file set (or at least a portion of the files 112 of the file set, such as for the unsecure files only or the secure files only). The data structures 118 may include any suitable type(s) of data structures (e.g., Bloom filters, counting bloom filters, hash compaction data structures, data structures for cuckoo hashing, and the like, as well as various combinations thereof). The data structures 118 may include a respective set of data structures for each file 112 of the file set for which data structures are to be configured and used. It is noted that the various functions of the probabilistic fingerprint checking capability are primarily depicted and described herein within the context of embodiments using Bloom filters as the data structures 118.

The DLP module 117 may be configured to perform online checking, including monitoring of a data flow for determining the contents of the data flow and whether or not the data flow is permitted to continue, using data structures based on white-listing techniques or black-listing techniques. In one embodiment in which white-listing is used, for example, data structures are constructed for the unsecure files such that if fingerprints determined from the data flow match fingerprints in the data structures then the data flow is known to include unsecure files that are permitted to leave the secure network 110 (and, thus, DLP module 117 allows the data flow to continue). In one embodiment in which black-listing is used, for example, data structures are constructed for the secure files such that if fingerprints determined from the data flow match fingerprints in the data structures then the data flow is known to include secure files that are not permitted to leave the secure network 110 (and, thus, DLP module 117 prevents the data flow from continuing). It is noted that the various functions of the probabilistic fingerprint checking capability are primarily depicted and described herein within the context of embodiments using white-listing techniques for controlling data flow.

The DLP module 117 has a database 119 associated therewith, which stores information for use by DLP module 117 in performing online checking of data flows from secure network 110 (e.g., data structures 118, data structure configuration information for data structures 118, and the like, as well as various combinations thereof). Although primarily depicted and described with respect to an embodiment in which the data structures 118 are stored in database 119, it is noted that the data structures 118 may be stored in any manner such that they are accessible to DLP module 117 for use in performing online checking for data flows using the data structures 118.

Figure 2:
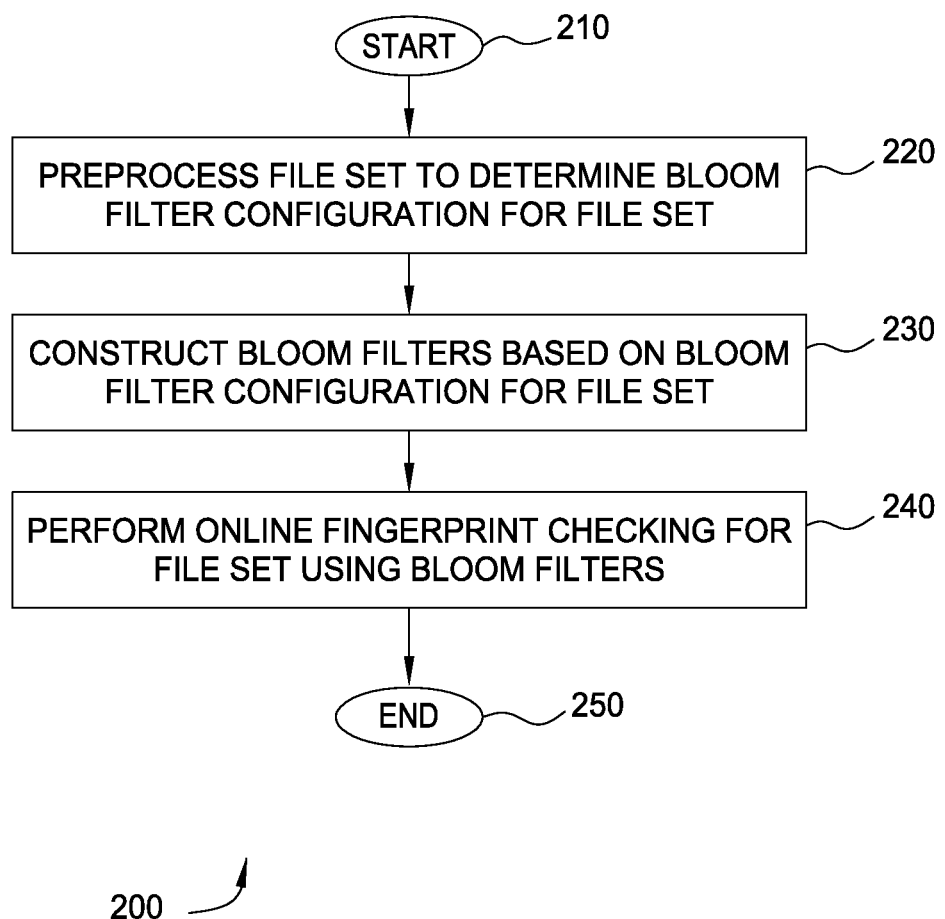
FIG. 2 depicts one embodiment of a method for enabling a device to perform online fingerprint checking for data flows being propagated via the device.

A method for configuring DLP module 117 to perform online checking for data flows from secure network 110 is depicted and described with respect to FIG. 2.

FIG. 2 depicts one embodiment of a method for enabling a device to perform online fingerprint checking for data flows being propagated via the device.

At step 210, method 200 begins.

At step 220, preprocessing of the file set is performed to determine a Bloom filter configuration for the file set. The Bloom filter configuration is for a configuration of a plurality of Bloom filters. The Bloom filter configuration specifies the filter locations of the Bloom filters and the filter sizes of the Bloom filters. The Bloom filter configuration also may specify the number of hash functions to be used for the Bloom filters. It is noted that, in at least some cases, there is a straightforward mapping between the target detection lag and the total amount of memory used to maintain the Bloom filters. An exemplary method for determining a Bloom filter configuration for a file set is depicted and described with respect to FIG. 3.

At step 230, the Bloom filters are constructed based on the Bloom filter configuration for the file set. The Bloom filters for the file set are constructed at the specified filter locations and are constructed to have the specified filter sizes, respectively. An exemplary method for constructing the Bloom filters is depicted and described with respect to FIG. 8.

At step 240, online fingerprint checking is performed for the file set using the Bloom filters. The online fingerprint checking is performed on a data stream received at the device for determining whether or not the data stream is to be allowed to continue. An exemplary method for performing online fingerprint checking using the Bloom filters is depicted and described with respect to FIG. 9.

At step 250, method 200 ends.

Figure 3:
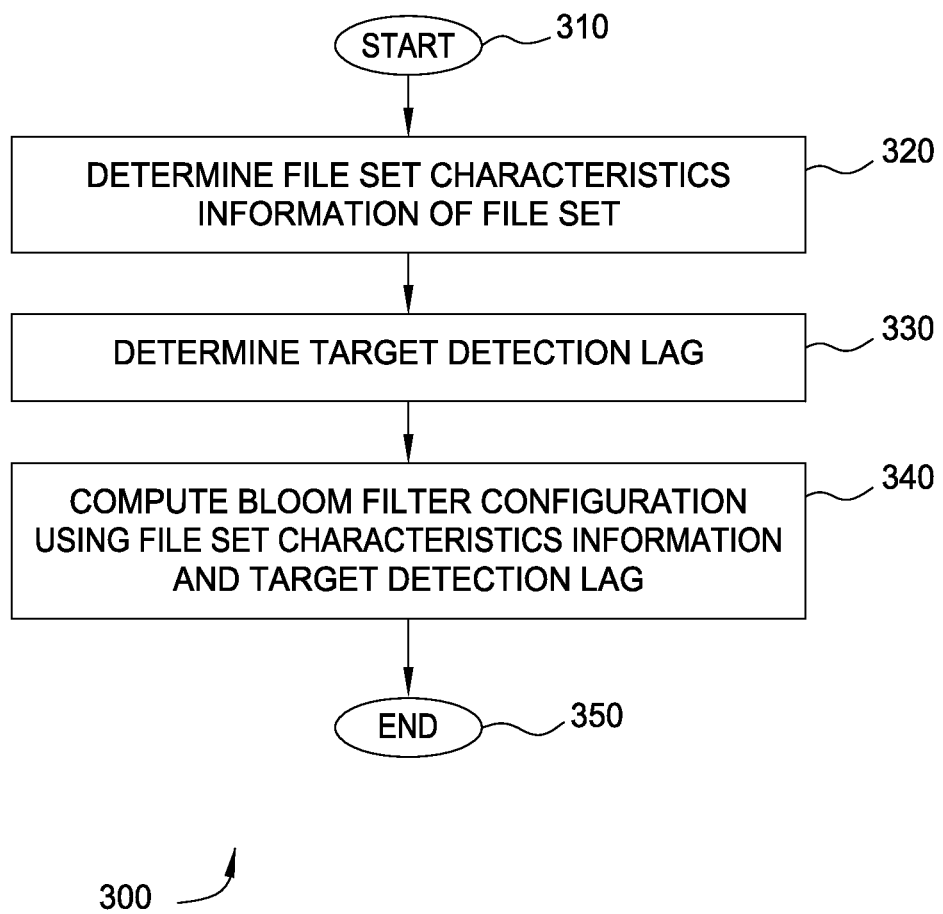
FIG. 3 depicts one embodiment of a method for determining a Bloom filter configuration for a file set.

FIG. 3 depicts one embodiment of a method for determining a Bloom filter configuration for a file set.

At step 310, method 300 begins.

At step 320, file set characteristics information of a file set is determined. The file set characteristics information may include the number of files in the file set, a file size of the largest file of the file set, file size distribution information associated with the files of the file set, and the like, as well as various combinations thereof. For example, the file size distribution information may include the file sizes of each of the files (or an indication that all files have a common file size), the number of files having file sizes greater than a given threshold, and the like, as well as various combinations thereof. The file set characteristics information may be retrieved from memory or determined in real time via analysis of the file set.

At step 330, a target detection lag is determined. The target detection lag is indicative of a maximum number of bits within which a data leakage event for the file set is to be determined (e.g., only X number of bits may be allowed to pass from a secure network to an unsecure network before the leak of data from the secure network to the unsecure network is detected).

At step 340, a Bloom filter configuration is computed using the file set characteristics information and the target detection lag. The target detection lag may be retrieved from memory (e.g., local or remote), requested from an operations support system, or determined in any other suitable manner.

The Bloom filter configuration specifies a number of Bloom filters to be used, a plurality of filter locations for the respective Bloom filters, and a plurality of filter sizes for the respective Bloom filters. In one embodiment, the filter location of the Bloom filters are specified in terms of respective bit positions in a string of bits and the filter sizes of the Bloom filters are specified in terms of respective numbers of bits used to implement the Bloom filters.

The Bloom filter configuration also may specify, for each of the Bloom filters, a number of hash functions to be used for the Bloom filter. In one embodiment, the numbers of hash functions of the respective Bloom filters are computed using a respective plurality of detection probabilities $p_i$ associated with the Bloom filters.

The Bloom filter configuration also may specify a total memory to be used to implement all of the Bloom filters (i.e., a combination of the filter sizes of all of the Bloom filters to be used).

The Bloom filter configuration also may be considered to include any other input information which may be input to computation of the Bloom filter configuration, intermediate information which may be computed as part of intermediate steps during computation of the Bloom filter configuration, and/or final information which may be output during computation of the Bloom filter configuration (where such information may vary depending on the manner in which the Bloom filter configuration is computed).

Figure 4:
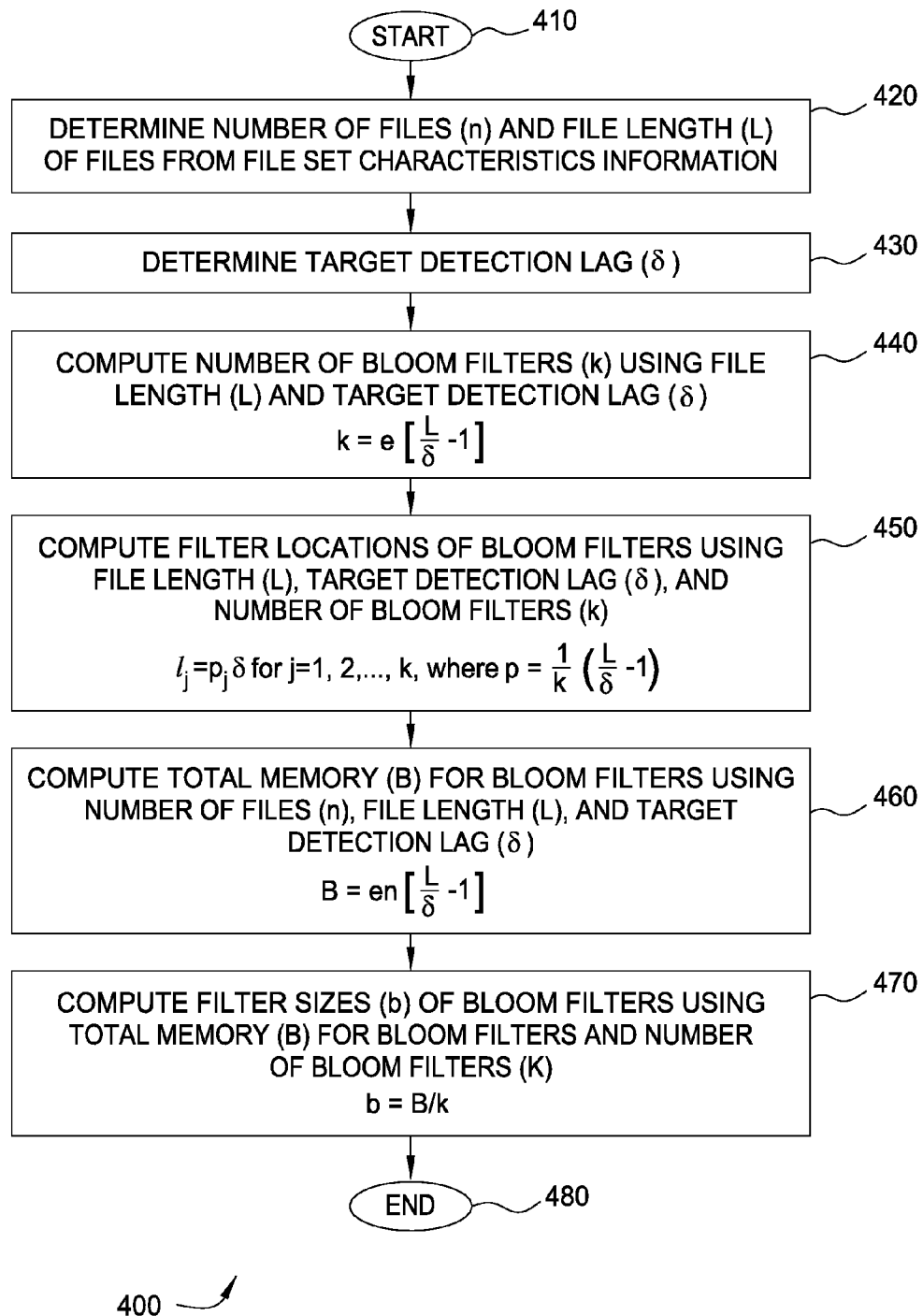
FIG. 4 depicts one embodiment of a method for determining a Bloom filter configuration for a file set having equal length files.
Figure 6:
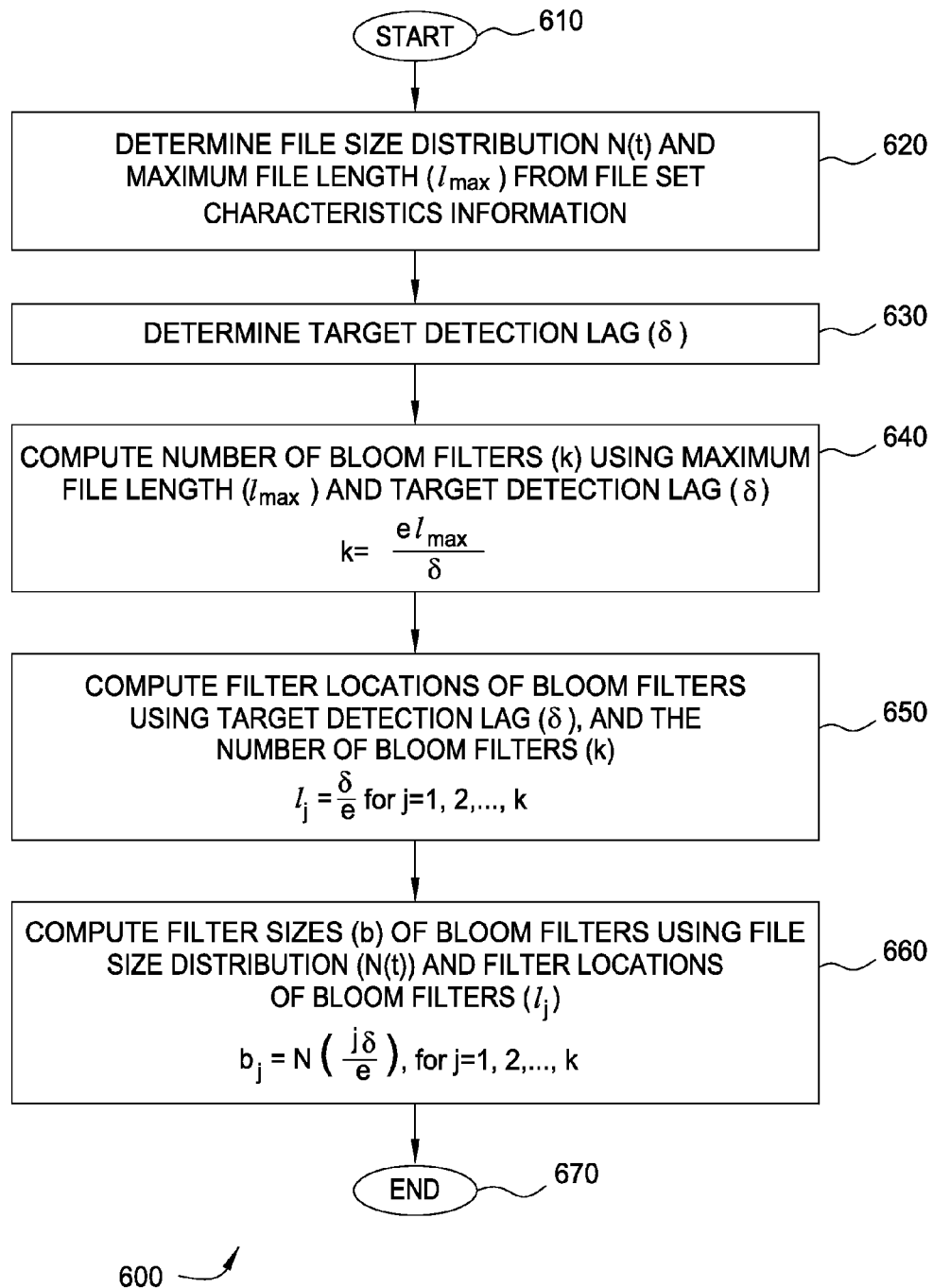
FIG. 6 depicts one embodiment of a method for determining a Bloom filter configuration for a file set using a heuristics-based process.

The Bloom filter configuration may be computed using one of more of method 400 of FIG. 4, method 600 of FIG. 6, and a method configured using or based on exemplary pseudocode 700 of FIG. 7.

At step 350, method 300 ends.

It is noted that computation of the Bloom filter configuration may be better understood by considering the following discussion of an exemplary implementation of Bloom filter based fingerprint checking for preventing data leakage from a secure network.

Bloom Filter Based Fingerprint Checking

Consider a database D including n binary strings $F_1, F_2, \ldots, F_n$. Let $l(F_j)$ denote the length (number of bits) in string j. Let $F_j[k]$ denote the string including the first k bits of string j.

Consider a binary input string S (denoted as string S) received one bit at a time where the length of S is not known in advance. The string S may be a data flow that is received. Let S[k] denote the string comprising of the first k bits of string S.

Consider a first definition (denoted as Definition 1), which defines a Feasibility Point as follows: given the database D, and the string S, we define string S to be k-feasible if there exits some $F_j \in D$ such that $S[t]=F_j[t]$ for all $t \le k$. In other words, the string S is k-feasible if the first k-bits of the string S are the same as the first k bits of a file in the database D.

Consider a second definition (denoted as Definition 2), which defines an Infeasibility Point as follows: given the database D, the infeasibility point (I(S)) for the string S is defined as the first place k at which the string S is not k-feasible. The infeasibility point for the string S is the first point at which the string S does not match any string $F_j \in D$. If a string S is not k-feasible for some $k \le I(S)$, then the string S is deemed to be infeasible. The infeasibility point for a string S is defined to be infinity if the entire string S is feasible, i.e., S is I(S)-feasible. In general, it is not practical to check if string S is feasible after each bit. In one embodiment, the string S is examined periodically using a deterministic or probabilistic checking mechanism. If the check is performed after bit t of string S has arrived, then it is possible to determine if string S is t-feasible. The checks can be broadly classified into one of two categories as follows:

(1) if the check is deterministic, then it will be known for certain that string S is t-feasible when the check is performed, and (2) if the check is probabilistic, and if string S is checked after t bits, then:
  (a) if string S is t-feasible, then the check will conclude that it is t-feasible with certainty, and
  (b) if string S is not t-feasible, then it will only be known that it is not t-feasible with some probability which is denoted herein as a detection probability.

It is noted, since the string is being checked only periodically, there will be a detection lag between the infeasibility point and the point at which infeasibility is detected. It is further noted that, even if the checks are deterministic, this detection lag can depend on the infeasibility point of the string.

Consider a third definition (denoted as Definition 3), which defines a Detection Lag as follows: the detection lag for a string S, which is denoted by $E[\Delta(S)]$, is defined as the point (e.g., bit position) from which the string becomes infeasible to the point (e.g., bit position) at which infeasibility is detected. In the case where the check is probabilistic, target detection lag may be considered to be an important parameter. In the case where the check is probabilistic, the target detection lag is $E[\Delta(S)]=E[D(S)]-I(S)$. In general, it is not feasible to check if S[t] is feasible for each value of t by comparing S[t] with each $F_j[t]$ for all $F_j \in D$. This is primarily due to the fact that this operation will take n*t comparisons where n is the number of strings in database D, which often is not practical since both n and I(S) (and hence t) can be relatively large.

In one embodiment, a fingerprint comparison technique may be used to achieve comparable performance with reduced processing. The basic idea in this fingerprint comparison technique is to create fingerprints of the substrings in the database and compare them to fingerprints that are created for an incoming string. There can be both processing as well as memory savings if the fingerprints can be created in a lightweight manner.

In one embodiment, computation and memory overhead which may result from performing direct fingerprint comparisons may be obviated via use of probabilistic fingerprint checking. In this embodiment, instead of checking the incoming string after each bit, the incoming string is only checked at fixed points (e.g., bit positions) denoted as fingerprint checking points $1 \le t_1 < t_2 < \ldots < t_p$. In this embodiment, a Bloom filter is associated with each of the fingerprint checking points (where the Bloom filter that is associated with fingerprint checking point $t_k$ is denoted as $B[t_k]$). In one embodiment, the probabilistic fingerprint checking mechanism operates as follows:

(1) for each string $F_j \in D$, compute a fingerprint for $F_j[t_k]$ for all $t_k \le l(F_j)$, which is denoted by $F[F_j[t_k]]$;

(2) the fingerprint is hashed into the Bloom filter $B[t_k]$;

(3) the fingerprint of the incoming string S, the fingerprint of $S[t_k]$ (which is denoted as $F[S[t_k]]$) is computed for all $t_k \le l(S)$; and (4) whenever a fingerprint $F[S[t_k]]$ is generated from string $S[t_k]$, it is hashed into the Bloom filter $B[t_k]$ to determine whether or not $F[S[t_k]]$ is in the Bloom filter.

If the Bloom filter indicates that $F[S[t_k]]$ is not in the Bloom filter, a conclusion is made that S is $t_k$-infeasible.

It is noted that any suitable type of fingerprint may be used for the fingerprints in the probabilistic fingerprint checking mechanism and, thus, that fingerprints may be computed using any suitable fingerprinting process (e.g., a checksum based process (e.g., a cyclic redundancy check (CRC) algorithm or any other suitable checksum based algorithm), SHA-1, and the like).

It is further noted that there is a significant savings in both memory and processing compared to other types of fingerprint checking techniques (e.g., when compared to a direct fingerprint comparison technique). For example, since fingerprints are not stored, the amount of memory that is used is independent of the fingerprint length. Once the fingerprint of string S is computed at some fingerprint checking point $t_k$, it is hashed into the Bloom filter $B[t_k]$, such that there is no direct fingerprint comparison (rather, at this point, there is just a check to determine whether the appropriate bits are zero or one). The probabilistic fingerprint checking mechanism, however, can result in false positives (i.e., there will be cases where S is $t_k$-infeasible but, due to collisions in the Bloom filter $B[t_k]$, there may be a conclusion that there is a fingerprint match). Therefore, the number of bits in $B[t_k]$ generally has to be chosen carefully.

Determining Filter Locations for Bloom Filters

The Bloom filters may be configured in a number of ways, and the manner in which the Bloom filters are configured may be at least partially dependent on some of the properties of probabilistic fingerprint checking.

Assume that there are k fingerprint checking points $t_1, t_2, \ldots, t_k$. Given a string S, define $l_1=t_1$ and $l_j=t_j-t_{j-1}$ for $j=2$, 3, ..., k and $l_{k+1}=I(S)-t_k$. Note that $l_j$ represents the number of bits between checks $t_{j-1}$ and $t_j$. As described above, the detection lag for a string is the time from which the string becomes infeasible to the time at which infeasibility is detected. In general, the detection lag will depend on the point at which the string becomes infeasible. Since the string is checked periodically, let $\theta(S, k)$ represent the detection lag when the string S becomes infeasible at bit k. It is noted that since the fingerprint checking mechanism is probabilistic, $\theta(S, k)$ will be a random variable. Therefore, $E[\theta(S, k)]$ refers to the expected detection lag when string S becomes infeasible at bit k. The worst case expected data leakage is give by $\max_k E[\theta(S, k)]$. In one embodiment, the worst case expected detection lag should be less than $\delta$. In other words, the probabilistic fingerprint checking mechanism may be configured to use a minimum amount of memory (or at least attempt to use a minimum amount of memory) while guaranteeing (or at least attempting to guarantee) that $$\max_k E[\theta(S, k)] \le \delta.$$

Consider a fourth definition (denoted as Definition 4), which defines a Detection Probability as follows: The detection probability at fingerprint checking point $t_k$ is the probability that a string that is infeasible at $t_k$ will be detected to be infeasible. The detection probability at $t_k$ is denoted as $p_k$. It is noted that the detection probability may play a role in determining memory allocation. It is noted that the detection probability at any fingerprint checking point depends upon the number of bits allocated to the Bloom filter at that fingerprint checking point.

Given a string S, consider the last fingerprint checking time $t_k$ for the string where $t_k \le l(S)$. Since the string is not checked after $t_k$, $E[\theta(S, t_{k+1})]=I(S)-t_k=l_{k+1}$. Since the goal is $E[\theta(S, k)] \le \delta$, set $l_{k+1}=\delta$ (technically $l_{k+1} \le \delta$, an equality is used since that is the least stringent condition). Now consider $E[\delta(S, t_{k-1}+1)]$, which is the target detection lag when the string becomes infeasible just after the fingerprint check at $t_{k-1}$. The infeasibility will be detected at fingerprint check $t_k$ with probability $p_k$. The target detection lag $E[\delta(S, t_{k-1}+1)]$ is rewritten as follows:

$$E[\theta(S, t_{k-1}+1)] = l_k p_k + (1-p_k)(l_k+l_{k+1})$$

$$= l_k + (1-p_k) l_{k+1}$$

$$= l_k + (1-p_k) \delta.$$

Given an interest in $\min \max_k E[\delta(S, k)]$, it is desirable to make $p_k$ such that $E[\delta(S, t_{k-1}+1)]=\delta$. Thus, $l_k+(1-p_k)\delta=\delta$. Solving for $p_k$, it is shown that $l_k=p_k\delta$. It is noted that if the string becomes infeasible at any point in the interval $l_k$, then the detection lag will only be lower. If the infeasibility bit is set just after checking at $l_{k-2}$, then the target detection lag will be $l_{k-1}+(1-P_{k-1})l_k++(1-p_{k-1})(1-p_k)l_{k+1}$. Again, it is noted that is it desirable to make this quantity to be equal to $\delta$. Thus, setting $l_{k-1}+(1-p_{k-1})l_k+(1-p_{k-1})(1-p_k)l_{k+1}=l_{k+1}$, substituting $l_k=p_k\delta$ and $l_{k+1}=\delta$, and simplifying, it is determined that $l_{k-1}=p_{k-1}\delta$. In other words, the filter locations ($l_j$) of the Bloom filters are determined based on detection probabilities $p_j$ associated with the fingerprint checking points $t_j$, respectively. Thus, it may be shown that the filter locations of the Bloom filters may be set as in Equation 1, which follows: $l_j=p_j\delta$ for $j=1, 2, \ldots, k$.

Determining Filter Size and Number of Hash Functions for Bloom Filter

In one embodiment, the filter sizes of the Bloom filters and the number of hash functions for the Bloom filters may be determined based on detection probabilities $p_j$ associated with the fingerprint checking points $t_j$, respectively. The filter size of a Bloom filter specifies the minimum number of bits needed to achieve the detection probability p associated with the fingerprint checking points t of the Bloom filter.

Assume that a given Bloom filter has a filter size of b bits with h hash functions. If there are n strings in the database, the detection probability p for a Bloom filter using h hash functions is given by Equation 2 as follows:

$$p = 1 - [1 - e^{-nh/b}]^h.$$

Assume that, given detection probability p, it is possible to determine the number of hashes h that minimizes the amount of memory b. Solving for b in Equation (2) gives Equation 3 as follows:

$$b = -\frac{nh}{\log\left[1 - (1-p)^{\frac{1}{h}}\right]}.$$

In this case, instead of differentiating with respect to h, set $$w = 1 - (1-p)^{\frac{1}{h}}$$

such that $h = [\log(1-p)]/[\log(1-w)]$. Then, using this value of h in Equation (3) results in:

$$b = -\frac{n\log(1-p)}{\log w \log(1-w)},$$

where the expression on the right is minimized when $w = \frac{1}{2}$.

As a result, the optimal number of hashes (h) for the Bloom filter is given by:

$$h = -\frac{\log(1-p)}{\log 2}.$$

As a further result, the minimum filter size (b) of the Bloom filter (e.g., minimum amount of memory) is given by Equation 4 as follows:

$$b = -\frac{n \log(1-p)}{\log^2 2}.$$

It is noted that, in the expressions above, it is assumed that the number of hashes can be fractional. The exact amount of memory takes into account the fact that the optimal number of hashes is integral.

It is further noted that a special case that may be of interest is the case where a single hash is used (h=1). In this case, the relationship between p and b (denoted as Equation 5) is given by:

$$p = \left(1 - \frac{1}{b}\right)^n \approx e^{-n/b} \text{ and } b = -\frac{n}{\log p}.$$

Thus, for a given value ($\delta$) of the detection lag, Equation [1] gives the filter locations of the Bloom filters as a function of the detection probabilities and Equation [4] gives the filter sizes of the Bloom filters (e.g., for each Bloom filter, the minimum number of bits needed per string in the database for achieving the associated detection probability associated with the Bloom filter). Furthermore, it is noted that decisions regarding where the fingerprint checks should be done may be made in a manner for minimizing the memory requirement and, further, that the location of the fingerprint checks depends on the distribution of string lengths $l(F_j)$ in the database. A special case (in which all strings in the database have the same length) is considered before the more general case (in which strings in the database have variable lengths) is considered.

Probabilistic Fingerprint Checking for Equal Length Strings

In this embodiment, the database includes n strings each of length L. In this embodiment, the decisions to be made for probabilistic fingerprint checking are: the number of fingerprint checking points (i.e., the number of Bloom filters to be used), the locations of each of the fingerprint checking points (i.e., the filter locations of the Bloom filters), and the numbers of bits to be allocated for each of the fingerprint checking points (i.e., the filter sizes of the Bloom filters).

In this embodiment, let $\delta$ represent the desired worst case expected detection lag, and assume that k fingerprint checking points are used (where the value of k is yet to be determined). From Equation (1) discussed above, it may be determined that $l_j = p_j \delta$ for $j = 1, 2, \ldots, k$.

Since all strings have length L $$\sum_{j=1}^{k} l_k + \delta = L,$$

which implies that:

$$L = \sum_{j=1}^{k} p_k l_{k+1} + \delta = \left(1 + \sum_{j=1}^{k} p_j\right)\delta.$$

Since all of the strings are equal length, it may be assumed that all $p_j$ will have equal values (denoted as p). Assume that k fingerprint checking points, each with detection probability p, are used. Then, setting $p_i = p$ in the last equation, and solving for p, results in:

$$p = \frac{1}{k}\left(\frac{L}{\delta} - 1\right).$$

The minimum number of bits needed to satisfy this detection probability is given in Equation [3] as follows:

$$b = -\frac{n\log\left[1 - \frac{1}{k}\left(\frac{L}{\delta} - 1\right)\right]}{\log^2 2}.$$

The total number of bits needed to satisfy this detection probability is given by:

$$B = -\frac{kn\log\left[1 - \frac{1}{k}\left(\frac{L}{\delta} - 1\right)\right]}{\log^2 2}.$$

The number of fingerprint checking points (value of k) is chosen to minimize (or at least to attempt to minimize) the total number of bits (value of B). As described hereinabove, this expression for B is only approximate since it assumes that a fractional number of hashes is used. However, it may be shown that B is a decreasing function of k. When k is large then p is small and a single hash function is optimal. For a single hash function, it may be determined that the amount of memory that is needed to achieve a given detection probability is given by Equation [5] and, therefore, using a single hash function the memory can be computed to be:

$$B = -\frac{kn}{\log\left[\frac{1}{k}\left(\frac{L}{\delta} - 1\right)\right]}.$$

Given δ, it is possible to determine the number of checking points k that minimizes B. Differentiating B with respect to k and setting to zero and solving for k, gives:

$$k = e\left[\frac{L}{\delta} - 1\right].$$

Thus, substituting this back into the expression for B, the minimal memory may be computed as (where in the last approximation it is assumed that L/δ>>1):

$$B = en\left[\frac{L}{\delta} - 1\right] \approx \frac{enL}{\delta}.$$

Then, we can write log B+log δ≈log(eLn).

FIG. 4 depicts one embodiment of a method for determining a Bloom filter configuration for a file set having equal length files.

At step 410, method 400 begins.

At step 420, the number of files (n) of the file set and the file length (L) of the files of the file set are determined from the file set characteristics information of the file set.

At step 430, the target detection lag (δ) is determined.

At step 440, the number of Bloom filters (k) is computed using the file length (L) of the files and the target detection lag (δ). For example, as noted above, the number of Bloom filters (k) may be computed as $$k = e\left[\frac{L}{\delta} - 1\right].$$

At step 450, the filter locations ($l_j$ for j=1, 2, . . . , k) of the Bloom filters are determined using the file length (L) of the files, the target detection lag (δ), and the number of Bloom filters (k). For example, as noted above, the filter locations ($l_j$ for j=1, 2, . . . , k) of the Bloom filters may be computed as $l_j = p_j\delta$ for j=1, k, where $$p = p = \frac{1}{k}\left(\frac{L}{\delta} - 1\right).$$

At step 460, the total memory (B) for the Bloom filters (i.e., all of the filter sizes of the Bloom filters combined) is computed using the number of files (n) of the file set, the file length (L) of the files, and the target detection lag (δ). For example, as noted above, the total memory (B) for the Bloom filters may be computed as $$B = en\left[\frac{L}{\delta} - 1\right] \approx \frac{enL}{\delta}.$$

At step 470, the filter sizes ($b_j$ for j=1, 2, . . . , k) are computed for the Bloom filters using the total memory (B) for the Bloom filters and the number of Bloom filters (k). For example, the filter sizes for the Bloom filters may be computed as b=B/k (i.e., all of the Bloom filters have the same filter size).

At step 480, method 400 ends.

Although primarily depicted and described as being performed serially, it will be appreciated that at least a portion of the steps of method 400 may be performed contemporaneously or in a different order than presented in FIG. 4.

Probabilistic Fingerprint Checking For Variable Length Strings

In this embodiment, the database includes n strings having variable lengths. Let string $F_j$ have length $l(F_j)$. Let $M = \Sigma_{j=1}^{n} l(F_j)$ represent the total number of bits in the database. Let $l_{max}$ denote the maximum string length in the database. Let N(t) denote the number of strings that are longer than t bits. This information is considered to by the file size distribution information.

In this embodiment, unlike the equal lengths embodiment described in the previous section (in which the strings have equal lengths and the number of bits of a given Bloom filter is only a function of the detection probability), the number of bits of a given Bloom filter is a function of both the detection probability associated with the Bloom filter and filter location of the Bloom filter. This case of probabilistic fingerprint checking for variable length strings is analyzed in two ways as follows: using a heuristic-based approach based on the analysis of the equal length string case and using a dynamic programming based approach for minimizing total memory, both of which are described below.

Heuristics-Based Approach

In the case where all the string lengths are L and the worst case target detection lag is given by δ, the detection probability at each of the fingerprint checking points is given by p≈L/kδ.

Since the optimal value of k≈eL, the value of p=1/e and the number of bits for each fingerprint checking point is L. For the problem with unequal string lengths, the following heuristic may be used:

(1) set the detection probability to 1/e at each Bloom filter, which implies that $l_j=\delta/e$ for all j (i.e., the fingerprint checking points are located at equal intervals of δ/e);

(2) the corresponding number of fingerprint checking points is $k \approx el_{max}/\delta$; and (3) the number of bits for fingerprint checking point j is $N(j\delta/e)$.

As a result, the total number of bits required for fingerprint checking (i.e., all of the fingerprint checking points) is given by:

$$B = \sum_{j=1}^{k} N\left(\frac{j\delta}{e}\right).$$

It is noted that $$\frac{\delta}{e}\sum_{j=1}^{k} N\left(\frac{j\delta}{e}\right) \approx M,$$

where $M=\Sigma_j l(F_j)$.

Figure 5:
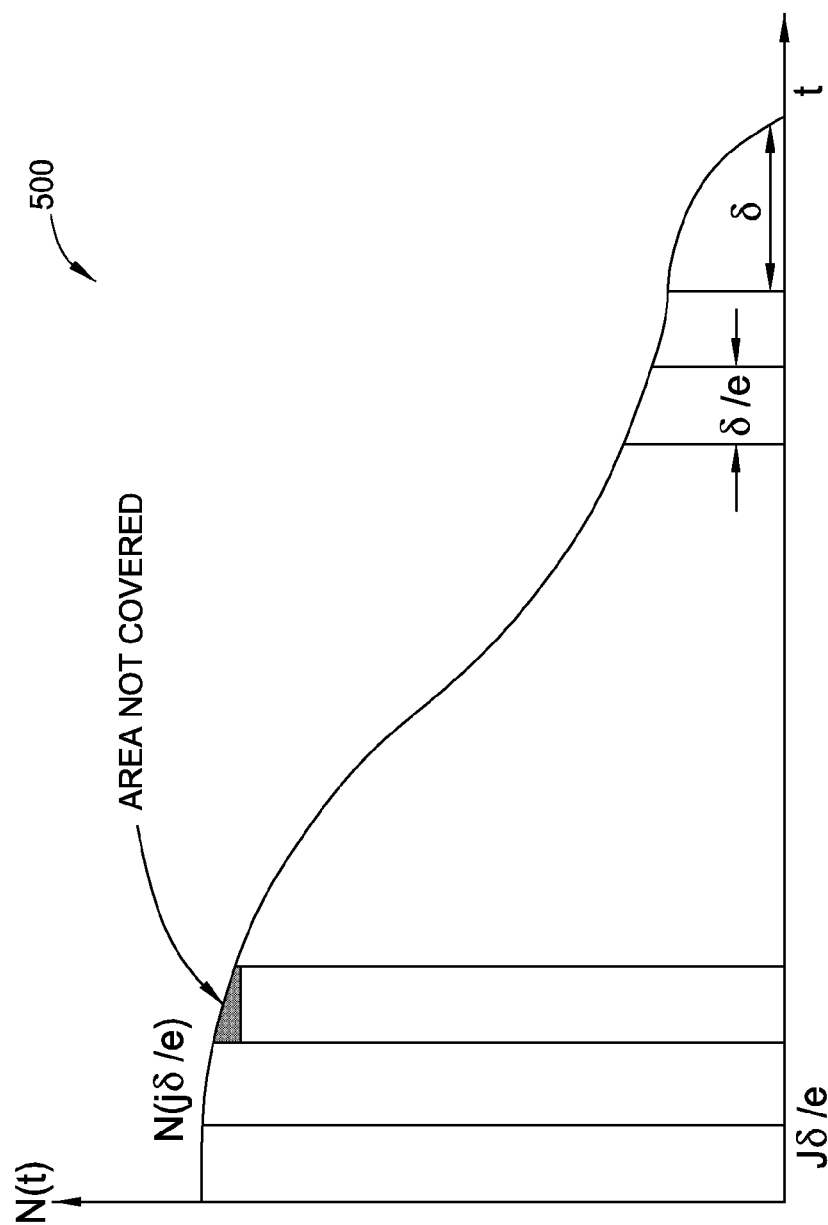
FIG. 5 depicts an exemplary graph of file set characteristics information for use in determining a Bloom filter configuration for a file set using a heuristics-based process.

The above-described heuristic may be inferred from the file set characteristic information, as represented in the exemplary graph of FIG. 5.

FIG. 5 depicts an exemplary graph of file set characteristics information for use in determining a Bloom filter configuration for a file set using a heuristics-based process. In exemplary graph 500 of FIG. 5, the x-axis represents the string length t and the y-axis represents the number of strings greater than t (denoted as N(t)). The area under this curve represents the total number of bits M in all the strings in the database. This can be seen by dividing the area into horizontal strips and summing the strips. If the area is divided into vertical strips each of width e and this width e is multiplied with the height of the curve that is given by N(je), an approximate value for the area under the curve is determined. It is assumed that the curve is relatively smooth and that the vertical strips are not too wide. If $\delta$ is small relative to $l_{max}$, then the strips will not be too wide. If the number of strings n in the database is large, and the lengths are not too concentrated, then the curve will be relatively smooth.

Therefore, $$\frac{\delta B}{e} \approx M,$$

which implies that the total number of bits needed for fingerprint checking is $$B = \frac{eM}{\delta}$$

(denoted as Equation 6), or $\log B + \log \delta \approx \log(eM)$. It is noted that Equation [6] gives a simple rule which may be used to determine the amount of memory required for the case with unequal string lengths. It is further noted that the equal interval scheme outlined above gives a feasible solution to the checking problem. It is further noted that this heuristic-based approach provides a relatively good approximation to the optimal solution for most, if not all, problem cases.

FIG. 6 depicts one embodiment of a method for determining a Bloom filter configuration for a file set using a heuristics-based process.

At step 610, method 600 begins.

At step 620, the file size distribution (N(t)) of the file set and the maximum file length ($l_{max}$) are determined from the file set characteristics information of the file set.

At step 630, the target detection lag ($\delta$) is determined.

At step 640, the number of Bloom filters (k) is computed using the maximum file length ($l_{max}$) and the target detection lag ($\delta$). For example, as noted above, the number of Bloom filters (k) may be computed as $k \approx el_{max}/\delta$.

At step 650, the filter locations ($l_j$ for j=1, 2, . . . , k) of the Bloom filters are determined using target detection lag ($\delta$). For example, as noted above, the filter locations ($l_j$ for j=1, 2, . . . , k) of the Bloom filters may be computed as $l_j=\delta/e$ for j=1, 2, . . . , k (i.e., the Bloom filters are equally spaced).

At step 660, the filter sizes ($b_j$ for j=1, 2, . . . , k) are computed for the Bloom filters using the file size distribution (N(t)) of the file set and the filter locations ($l_j$ for j=1, 2, . . . , k) of the Bloom filters. For example, the filter sizes for the Bloom filters may be computed as $b_j=N(j\delta/e)$.

At step 670, method 600 ends.

Although primarily depicted and described as being performed serially, it will be appreciated that at least a portion of the steps of method 600 may be performed contemporaneously or in a different order than presented in FIG. 6.

Dynamic Programming Based Approach

As described hereinabove, the unequal length string problem is difficult due to the fact that the detection probability is a function of where fingerprint checking is done. Recall that N(t) is the number of strings that are longer than t bits. If a goal is to achieve a detection probability of p at location t, then the number of bits needed may be given by:

$$b(t, p) = \frac{-N(t)\log(1 - p)}{\log^2 2}.$$

Therefore, it may be determined that it is better to check where N(t) is low, although this may need to be balanced with the fact that the maximum worst case target detection lag $\delta$ also needs to be met. In one embodiment, the fingerprint check locations and the number of bits for the Bloom filter at each of the fingerprint check locations are determined using a dynamic programming process.

In one embodiment, a dynamic programming process is used to determine Bloom filter configuration. Exemplary pseudocode for such a dynamic programming process is depicted and described with respect to FIG. 7.

FIG. 7 depicts exemplary pseudocode for one embodiment of a method for determining a Bloom filter configuration for a file set using a dynamic programming based process.

The dynamic programming process as represented by the exemplary pseudocode 700 uses (1) a state f(t) at bit t, which is a state which represents the optimum number of bits needed up to (but not including) t, and (2) an auxiliary variable p(t), used to roll back the dynamic programming process, where the value of p(t) represents the nearest location, to the right of fingerprint checking point t, where there will be a fingerprint checking point.

The dynamic programming process as represented by the exemplary pseudocode 700 initializes f(t)=0 for all $1 \leq t \leq l_{max}$, $f(l_{max}-\delta)=0$, and $p(l_{max}-\delta)=0$. Since $l_{k+1}=\delta$, the last check is set at $l_{max}-\delta$. This is depicted in lines 2-4 of exemplary pseudocode 700.

The dynamic programming process as represented by the exemplary pseudocode 700 works backward from $l_{max}$ to the first bit (as represented by the "for" loop in lines 5-10 of exemplary pseudocode 700).

The dynamic programming process as represented by the exemplary pseudocode 700 computes f(t). At any generic step of the dynamic programming process, the minimum number of bits needed up to t (denoted as f(t)) is determined as follows:

$$f(t) = \min_{1 \le g < \delta} b\left(t+g, \frac{g}{\delta}\right) + f(t+g).$$

The first term represents the number of bits needed at location (t+g) if a Bloom filter is at location t. In this case, the distance between the Bloom filters is g and, from Equation [1], it may be determined that the detection probability at t+g has to be g. There are N(t+g) strings at location (t+g). Thus, the number of bits needed at location (t+g) is given by b(t+g, g). The second term f(t+g) represents the minimum number of bits needed from t+g. The value of g cannot be larger than δ since this will make the expected worst case detection lag greater than δ.

The dynamic programming process as represented by the exemplary pseudocode 700 computes p(t). Let g* denote the location that achieves the minimum value of p(t). The location g* may be computed as:

$$g^* = \arg \min_{1 \le g < \delta} b\left(t+g, \frac{g}{\delta}\right) + f(t+g).$$

In this case, p(t) is computed as follows: p(t)=t+g*.

The dynamic programming process as represented by the exemplary pseudocode 700, after executing the "for" loop, determines the filter locations ($t_j$) and filter sizes ($b_j$) of the Bloom filters (as represented by lines 11-15 of exemplary pseudocode 700). As indicated in line 11 of exemplary pseudocode 700: (1) the Bloom filter tracking variable j is set equal to one (j=1) and (2) the filter location variable $t_j$ is initialized to the filter location associated with p(1) as $t_j \leftarrow p(1)$. As indicated by lines 12 and 15 of exemplary pseudocode 700, a "while" loop is used to provide the filter locations ($t_j$) and filter sizes ($b_j$) of the Bloom filters. As indicated in line 11 of exemplary pseudocode 700: (1) an intermediate variable (next) is set equal to the detection probability of filter location $t_j$ for the current value of j (i.e., next $\leftarrow p(t_j)$), (2) the value of j is incremented by one (i.e., j=j+1), and (3) the filter location $t_j$ for the current value of j is set equal to the current value of next (i.e., $t_j \leftarrow$ next). As indicated in line 12 of exemplary pseudocode 700, for each of the Bloom filters of the Bloom filter configuration: (1) the filter location $t_j$ of Bloom filter j is known and (2) the filter size of Bloom filter j is determined using $b[t_j, ((t_j - t_{j-1})/\delta)]$.

It is noted that the running time of the dynamic programming process is $O(l_{max} \delta)$ since at each bit it is necessary to compute the minimum of δ values and there are $l_{max}$ bits.

Although primarily depicted and described herein with respect to use of the file size distribution (N(t)) to minimize overall memory size of the Bloom filters, it is noted that a function of the file size distribution (f(N(t))) may be used in place of the file size distribution (N(t)) in order to determine a Bloom filter configuration for Bloom filters for a file set. For example, such functions may include linear functions (e.g., c*N(t), where c is a constant), quadratic functions (e.g., $N(t)^2$, log(N(t)), and the like), and the like. Thus, references herein to file size distribution N(t) may be read more generally as being a function of file size distribution f(N(t)) with file size distribution N(t) representing one instance of f(N(t)) that uses a direct representation of N(t).

As described above, the Bloom filter configuration may be computed in a number of ways (e.g., based on an assumption of equal-length files, using a heuristics-based approach (e.g., where there is an assumption that files do not have equal lengths), using a dynamic programming based approach (e.g., where there is an assumption that files do not have equal lengths), and the like).

As described above, Bloom filters for use in performing online fingerprint checking may be constructed using the Bloom filter configuration.

Figure 8:
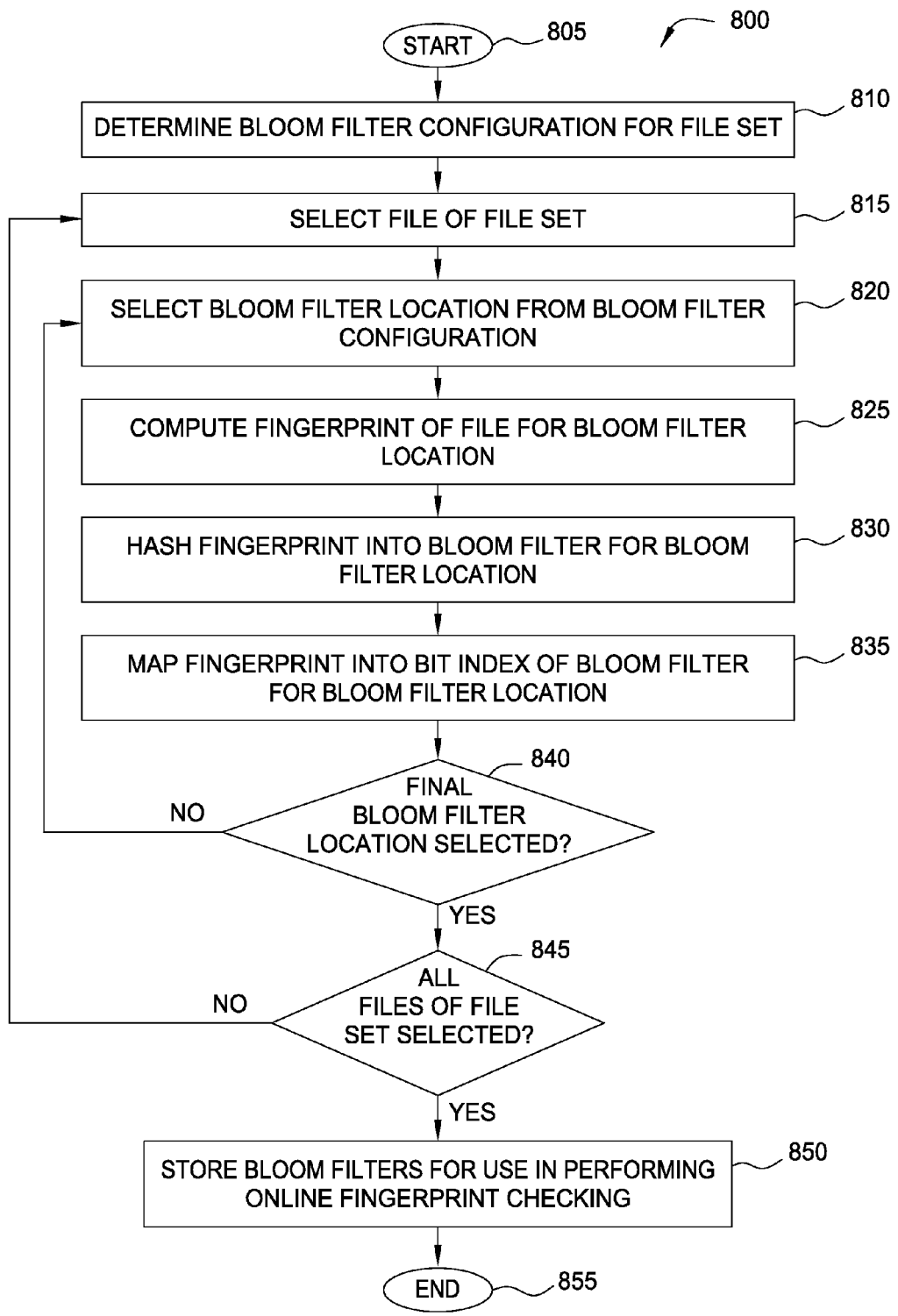
FIG. 8 depicts one embodiment of a method for constructing Bloom filters based on a Bloom filter configuration for a file set.

FIG. 8 depicts one embodiment of a method for constructing Bloom filters based on a Bloom filter configuration for a file set.

At step 805, method 800 ends.

At step 810, a Bloom filter configuration for a file set is determined.

The Bloom filter configuration includes filter locations and filter sizes for each of the Bloom filters to be constructed. The Bloom filter configuration may be determined using method 300 of FIG. 3 (which may be determined using method 400 of FIG. 4, method 500 of FIG. 6, or method 600 of FIG. 6).

At step 815, a file of the file set is selected. The files of the file set may be selected in any suitable order.

At step 820, a Bloom filter location is selected. The Bloom filter locations may be selected in any suitable order.

At step 825, a fingerprint is computed for the file for the selected Bloom filter location. The fingerprints may be any suitable type of fingerprints. The fingerprints are computed using a fingerprint process or algorithm (e.g., a checksum based process (e.g., CRC or other checksum based algorithms), SHA-1, and the like). It is noted that, where a checksum based process is used, the checksums may be 32-bit CRC checksums or any other suitable type(s) of checksums (although smaller sized checksums generally may be used since probabilistic checking is being used).

At step 830, the fingerprint is hashed into the Bloom filter for the selected Bloom filter location. It is noted that, in many cases, Bloom filters may need multiple hash functions. The use of multiple hash functions may be achieved in any suitable manner. In one embodiment, for example, use of multiple hash functions may be achieved by appending random numbers at the end of the data and computing a new fingerprint corresponding to each hash function.

At step 835, the fingerprint is mapped into a bit index of the Bloom filter for the selected Bloom filter location. In one embodiment, for example, where the fingerprints are checksums, the checksum values may be mapped into a bit index of the Bloom filter using checksum mod m, where m is the number of bits in the Bloom filter.

At step 840, a determination is made as to whether the final Bloom filter location has been selected. If the final Bloom filter location has not been selected, method 800 returns to step 820 (at which point a next Bloom filter location is selected). If the final Bloom filter location has been selected, method 800 proceeds to step 845.

At step 845, a determination is made as to whether all files of the file set have been selected for processing. If all files of the file set have not been selected for processing, method 800 returns to step 815 (at which point a next file of the file set is selected). If all files of the file set have been selected for processing, method 800 proceeds to step 850.

At step 850, the Bloom filters are stored for use in performing online fingerprint checking.

At step 855, method 800 ends.

Although omitted from method 800 for purposes of clarity, it will be appreciated that method 800 also may include a step of allocating memory for use in storing the Bloom filters.

Figure 9:
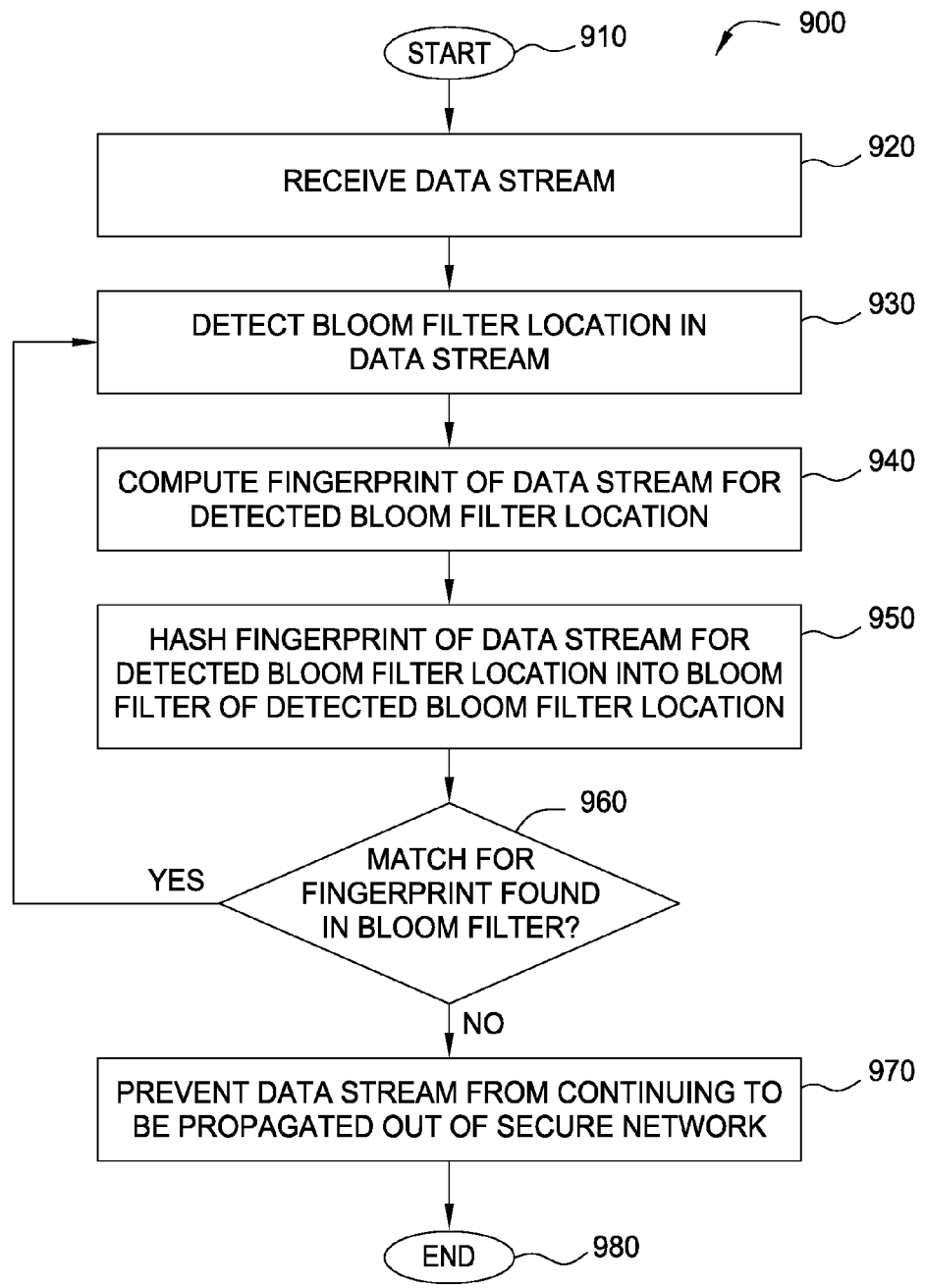
FIG. 9 depicts one embodiment of a method for performing online fingerprint checking using Bloom filters to control flow of data from a secure network.

FIG. 9 depicts one embodiment of a method for performing online fingerprint checking using Bloom filters to control flow of data from a secure network.

At step 910, method 900 begins.

At step 920, a data stream is received. The data stream is received at a device at a boundary between a secure network and an unsecure network. The device is configured to propagate the data stream from the secure network toward the unsecure network as long as a data leakage event is not detected.

At step 930, a Bloom filter location is detected in the data stream. It is noted that processing may be begin after a portion of the data stream is received (namely, when a first Bloom filter location is detected within the data stream) and may continue to be performed as additional data of the data stream continues to be received (and additional Bloom filter locations are detected within the data stream).

At step 940, a fingerprint of the data stream is computed for the detected Bloom filter location. The fingerprint may be any suitable type of fingerprint, as long as the fingerprint matches the type of fingerprint used to create the Bloom filter. For example, the fingerprints may be computed using a fingerprint process or algorithm (e.g., a checksum based process (e.g., CRC or other checksum based algorithms), SHA-1, and the like).

At step 950, the fingerprint of the data stream for the detected Bloom filter location is hashed into the Bloom filter for the detected Bloom filter location.

At step 960, a determination is made as to whether a match for the fingerprint of the data stream is found in the Bloom filter for the detected Bloom filter location. If a match is found, a data leakage event is not detected and method 900 returns to step 930, at which point a next Bloom filter location is detected in the data stream (i.e., the data stream is allowed to continue to be propagated outside of the secure network). If a match is not found, a data leakage event is detected and method 900 proceeds to step 970.

At step 970, the data stream is prevented from continuing to be propagated out of the secure network. For example, the data stream may be terminated, redirected to a secure device within the secure network for containment and analysis of the data leakage event, and the like.

At step 980, method 900 ends.

Although omitted from FIG. 9 for purposes of clarity, it is noted that, in one embodiment, in order to minimize leakage of small files, a fingerprint check is performed at the end of each data flow before releasing the last packet of the data flow (e.g., such that small files that are included within single packets can be checked).

Although method 900 of FIG. 9 is directed toward an embodiment in which white-listing is used to control flow of data from the secure network (e.g., where the Bloom filters include fingerprints for unsecure files of the secure network), it will be appreciated that method 900 of FIG. 9 may be adapted to use black-listing to control flow of data from the secure network (e.g., in which case the Bloom filters include fingerprints for secure files of the secure network and step 960 is modifies such that method 900 returns to step 930 when a match is not found and proceeds to step 970 when a match is found).

Although primarily depicted and described herein within the context of files, it will be appreciated that the various embodiments depicted and described herein may be applied to any form of data (e.g., database entries of a database, data strings in a data set, data chunks in a data set, and the like). Thus, for at least some embodiments, references herein to files and file sets may be read more generally as data and data sets.

Although primarily depicted and described herein with respect to use of fingerprint checks to prevent leakage of data from secure networks, fingerprint checks may be used to provide various other functions in which tracking of data flows may be necessary or desirable.

As noted above, although primarily depicted and described herein with respect to embodiments in which a specific type of data structure is used to perform fingerprint checking (namely, Bloom filters), it is noted that various other types of data structures may be used to perform fingerprint checking (e.g., counting bloom filters, hash compaction data structures, data structures for cuckoo hashing, and the like). Accordingly, references herein to Bloom filters may be read more generally as being references to data structures (and, similarly, references herein to filter locations and filter sizes may be read more generally as being references to data structure locations and data structure sizes, respectively.

Figure 10:
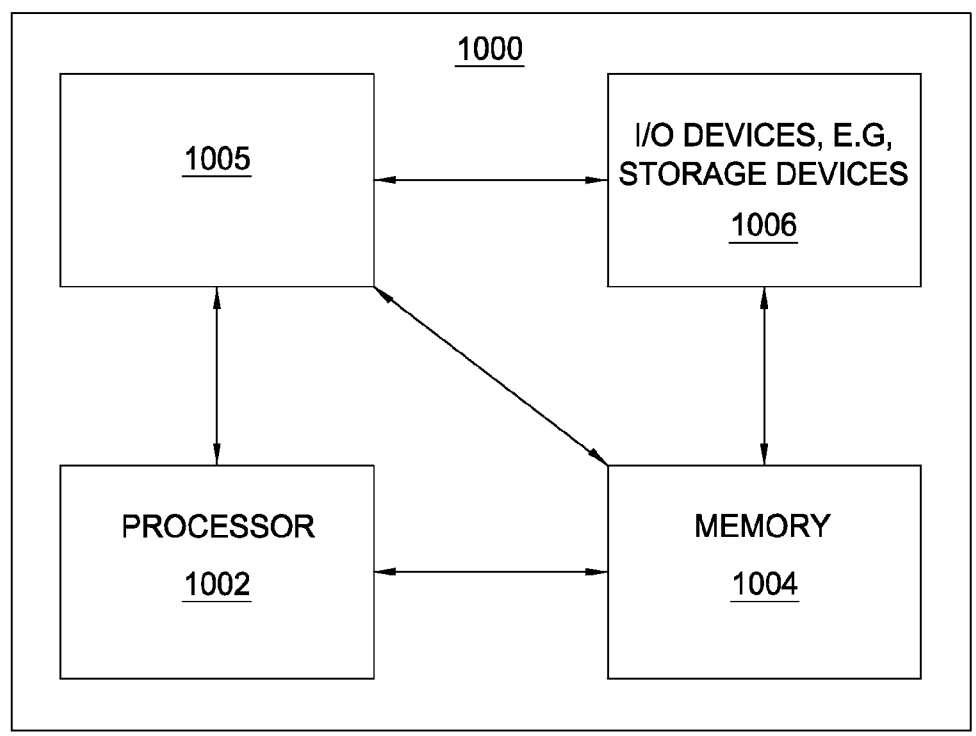
FIG. 10 depicts a high-level block diagram of a computer suitable for use in performing functions described herein.

FIG. 10 depicts a high-level block diagram of a computer suitable for use in performing functions described herein.

As depicted in FIG. 10, computer 1000 includes a processor element 1002 (e.g., a central processing unit (CPU) and/or other suitable processor(s)) and a memory 1004 (e.g., random access memory (RAM), read only memory (ROM), and the like). The computer 1000 also may include a cooperating module/process 1005 and/or various input/output devices 1006 (e.g., a user input device (such as a keyboard, a keypad, a mouse, and the like), a user output device (such as a display, a speaker, and the like), an input port, an output port, a receiver, a transmitter, and storage devices (e.g., a tape drive, a floppy drive, a hard disk drive, a compact disk drive, and the like)).

It will be appreciated that the functions depicted and described herein may be implemented in software (e.g., for executing on a general purpose computer (e.g., via execution by one or more processors) so as to implement a special purpose computer) and/or may be implemented in hardware (e.g., using one or more application specific integrated circuits (ASIC) and/or one or more other hardware equivalents).

In one embodiment, the cooperating process 1005 can be loaded into memory 1004 and executed by the processor 1002 to implement functions as discussed herein. Thus, cooperating process 1005 (including associated data structures) can be stored on a computer readable storage medium, e.g., RAM memory, magnetic or optical drive or diskette, and the like.

It will be appreciated that computer 1000 depicted in FIG. 10 provides a general architecture and functionality suitable for implementing functional elements described herein and/or portions of functional elements described herein. For example, the computer 1000 provides a general architecture and functionality suitable for implementing one or more of one or more of server 111, network boundary device 115, firewall 116, DLP module 117, database 119, one or more of the user terminals 120, and the like.

It is contemplated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media, transmitted via a data stream in a broadcast or other signal bearing medium, and/or stored within a memory within a computing device operating according to the instructions.

Although various embodiments which incorporate the teachings of the present invention have been shown and described in detail herein, those skilled in the art can readily devise many other varied embodiments that still incorporate these teachings.

What is claimed is:

1. An apparatus, comprising:
a processor and a memory communicatively coupled to the processor, the processor configured to:
receive file set characteristics information of a file set comprising a plurality of files;
receive a target detection lag indicative of a maximum number of bits within which a data leakage event for the file set is to be determined; and
compute, based on the file set characteristics information and the target detection lag, a data structure configuration for a plurality of data structures configured for use in monitoring the files of the file set, wherein the data structure configuration comprises a plurality of data structure locations for the respective plurality of data structures and a plurality of data structure sizes for the respective plurality of data structures.

2. The apparatus of claim 1, wherein the data leakage event comprises allowing at least a portion of one of the files of the file set to pass from a secure network to an unsecured network.

3. The apparatus of claim 1, wherein the file set characteristics information indicates that at least one of the files of the file set has a file length L, wherein, to compute the data structure locations for the data structures, the processor is configured to:
compute, based on the file length L and the target detection lag, a number of data structures to be used for the data structure configuration; and
compute the data structure locations for the data structures based on the number of data structures to be used for the data structure configuration.

4. The apparatus of claim 3, wherein the processor is configured to compute the number of data structures (k) to be used for the data structure configuration using $$k = e\left[\frac{L}{\delta} - 1\right],$$

wherein $\delta$ is the target detection lag.

5. The apparatus of claim 1, wherein the file set includes a number of files n, wherein the file set characteristics information indicates that at least one of the files of the file set has a file length L, wherein, to compute the data structure sizes for the data structures, the processor is configured to:
compute a total number of bits to be used for the data structures, wherein the total number of bits to be used for the data structures is computed based on the number of files n, the file length L, and the target detection lag; and
compute the data structure sizes for the data structures based on a number of data structures to be used for the data structure configuration and the total number of bits to be used for the data structures.

6. The apparatus of claim 5, wherein the processor is configured to compute the total number of bits (B) to be used for the data structures using $$B = en\left[\frac{L}{\delta} - 1\right],$$

wherein $\delta$ is the target detection lag.

7. The apparatus of claim 5, wherein the processor is configured to compute the data structure sizes for the data structures using division of the total number of bits to be used for the data structures by the number of data structures to be used for the data structure configuration.

8. The apparatus of claim 1, wherein the processor is configured to use a heuristics-based process to compute the data structure configuration.

9. The apparatus of claim 1, wherein, to compute the data structure configuration, the processor is configured to:
determine a file size distribution (N(t)) of the file set and a maximum file size ($l_{max}$) of the files in the file set based on the file set characteristics information;
compute a number of data structures (k) based on the maximum file size ($l_{max}$) and the target detection lag ($\delta$);
compute the data structure locations of the data structures based on the target detection lag and the number of data structures (k); and
compute the data structure sizes of the data structures based on the file size distribution (N(t)) of the file set and the data structure locations of the data structures.

10. The apparatus of claim 9, wherein the processor is configured to compute the number of data structures (k) using $k = el_{max}/\delta$, wherein $\delta$ is the target detection lag.

11. The apparatus of claim 9, wherein the processor is configured to compute the data structure locations ($l_j$) of the data structures using $l_j = j\delta/e$ for j=1 to k.

12. The apparatus of claim 9, wherein the processor is configured to compute the data structure sizes of the data structures using $b_j = N(j\delta/e)$, wherein $\delta$ is the target detection lag.

13. The apparatus of claim 1, wherein, to determine the data structure configuration, the processor is configured to:
determine a file size distribution (N(t)) of the file set and a maximum file size ($l_{max}$) of the files in the file set based on the file set characteristics information;
for each bit (t) from the maximum file size ($l_{max}$) to the first bit:
compute a minimum number of bits (f(t)) needed up to bit t using $$f(t) = \min_{1 \le g < \delta} b\left(t+g, \frac{g}{\delta}\right) + f(t+g),$$

wherein $\delta$ is the target detection lag;
determine a location (g*) that achieves the minimum number of bits f(t) using $$g^* = \arg\min_{1 \le g < \delta} b\left(t+g, \frac{g}{\delta}\right) + f(t+g);$$

and
compute a detection probability (p(t)) for bit t using p(t)=t+g*; and
compute the data structure locations and the data structure sizes for the data structures based on the detection probabilities.

14. The apparatus of claim 13, wherein, to compute the data structure locations and the data structure sizes for the data structures based on the detection probabilities, the processor is configured to:
  initialize a data structure counter variable (j) and set a data structure location ($t_j$) to a bit location associated a detection probability p(1);
  while the detection probability at the data structure location ($t_j$) is not zero, perform:
    set an intermediate variable equal to the detection probability at the data structure location ($t_j$);
    increment the data structure counter variable by one;
    compute the data structure location ($t_j$) of the data structure for the data structure counter variable as a bit location associated with the intermediate variable; and
    compute the data structure size ($b_j$) of the data structure for the data structure counter variable using $b[t_j, ((t_j - t_{j-1})/\delta)]$.

15. The apparatus of claim 1, wherein the processor is configured to:
  construct the data structures based on the data structure configuration.

16. The apparatus of claim 15, wherein, to construct the data structures based on the data structure configuration, the processor is configured to:
  for at least one of the files of the file set:
    compute a plurality of fingerprints associated with the respective data structure locations of the data structures; and
    hash the plurality of fingerprints into the respective plurality of data structures associated with the respective data structure locations of the data structures.

17. The apparatus of claim 1, wherein the processor is configured to:
  receive a data stream comprising a plurality of bits; and
  perform fingerprint checking of the data stream, using at least a portion of the data structures, for determining whether to allow the data stream to continue.

18. The apparatus of claim 17, wherein, to perform fingerprint checking of the data stream, the processor is configured to:
  compute a fingerprint for the data stream, the fingerprint associated with one of the data structure locations;
  hash the fingerprint into one of the data structures associated with the one of the data structure locations; and
  determine whether to allow the data stream to continue based on hashing of the fingerprint into the one of the data structures associated with the one of the data structure locations.

19. A non-transitory computer-readable storage medium storing instructions which, when executed by a computer, cause the computer to perform a method, the method comprising:
  receiving file set characteristics information of a file set comprising a plurality of files;
  receiving a target detection lag indicative of a maximum number of bits within which a data leakage event for the file set is to be determined; and
  computing, based on the file set characteristics information and the target detection lag, a data structure configuration for a plurality of data structures configured for use in monitoring the files of the file set, wherein the data structure configuration comprises a plurality of data structure locations for the respective plurality of data structures and a plurality of data structure sizes for the respective plurality of data structures.

20. A method, comprising:
  using a processor for:
    receiving file set characteristics information of a file set comprising a plurality of files;
    receiving a target detection lag indicative of a maximum number of bits within which a data leakage event for the file set is to be determined; and
    computing, based on the file set characteristics information and the target detection lag, a data structure configuration for a plurality of data structures configured for use in monitoring the files of the file set, wherein the data structure configuration comprises a plurality of data structure locations for the respective plurality of data structures and a plurality of data structure sizes for the respective plurality of data structures.

* * * * *